US007080218B2

(12) United States Patent
Dias et al.

(10) Patent No.: US 7,080,218 B2
(45) Date of Patent: Jul. 18, 2006

(54) REAL-TIME SHARED DISK SYSTEM FOR COMPUTER CLUSTERS

(75) Inventors: Daniel Manuel Dias, Mahopac, NY (US); Rajat Mukherjee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/990,230

(22) Filed: Nov. 16, 2004

(65) Prior Publication Data

US 2005/0071577 A1    Mar. 31, 2005

Related U.S. Application Data

(63) Continuation-in-part of application No. 09/551,745, filed on Apr. 18, 2000, now Pat. No. 6,877,072, which is a continuation of application No. 09/113,752, filed on Jul. 10, 1998, now Pat. No. 6,182,197.

(51) Int. Cl.
  *G06F 12/00*  (2006.01)
(52) U.S. Cl. .................. 711/158; 711/151; 710/39; 710/40; 709/212; 725/87; 725/92; 725/97
(58) Field of Classification Search ............... 711/151, 711/158; 710/39, 40; 709/212; 725/87, 725/92, 97
See application file for complete search history.

(56) References Cited

U.S. PATENT DOCUMENTS

| 5,511,188 | A | * | 4/1996 | Pascucci et al. ............. 707/203 |
| 5,522,080 | A | * | 5/1996 | Harney ......................... 710/220 |
| 5,787,482 | A | * | 7/1998 | Chen et al. ................... 711/158 |
| 5,944,792 | A | * | 8/1999 | Yamato et al. ............... 709/219 |
| 5,946,498 | A | * | 8/1999 | Chiang et al. ................. 710/54 |
| 6,023,720 | A | * | 2/2000 | Aref et al. .................... 718/103 |
| 6,078,998 | A | * | 6/2000 | Kamel et al. ................. 711/151 |
| 6,378,036 | B1 | * | 4/2002 | Lerman et al. ............... 711/112 |

* cited by examiner

*Primary Examiner*—Kevin Verbrugge
*Assistant Examiner*—Mehdi Namazi
(74) *Attorney, Agent, or Firm*—John L. Rogitz

(57) ABSTRACT

A clustered computer system includes a shared data storage system, preferably a virtual shared disk (VSD) memory system, to which the computers in the cluster write data and from which the computers read data, using data access requests. The data access requests can be associated with deadlines, and individual storage devices in the shared storage system satisfy competing requests based on the deadlines of the requests. The deadlines can be updated and requests can be killed, to facilitate real time data access for, e.g., multimedia applications such as video on demand.

1 Claim, 2 Drawing Sheets

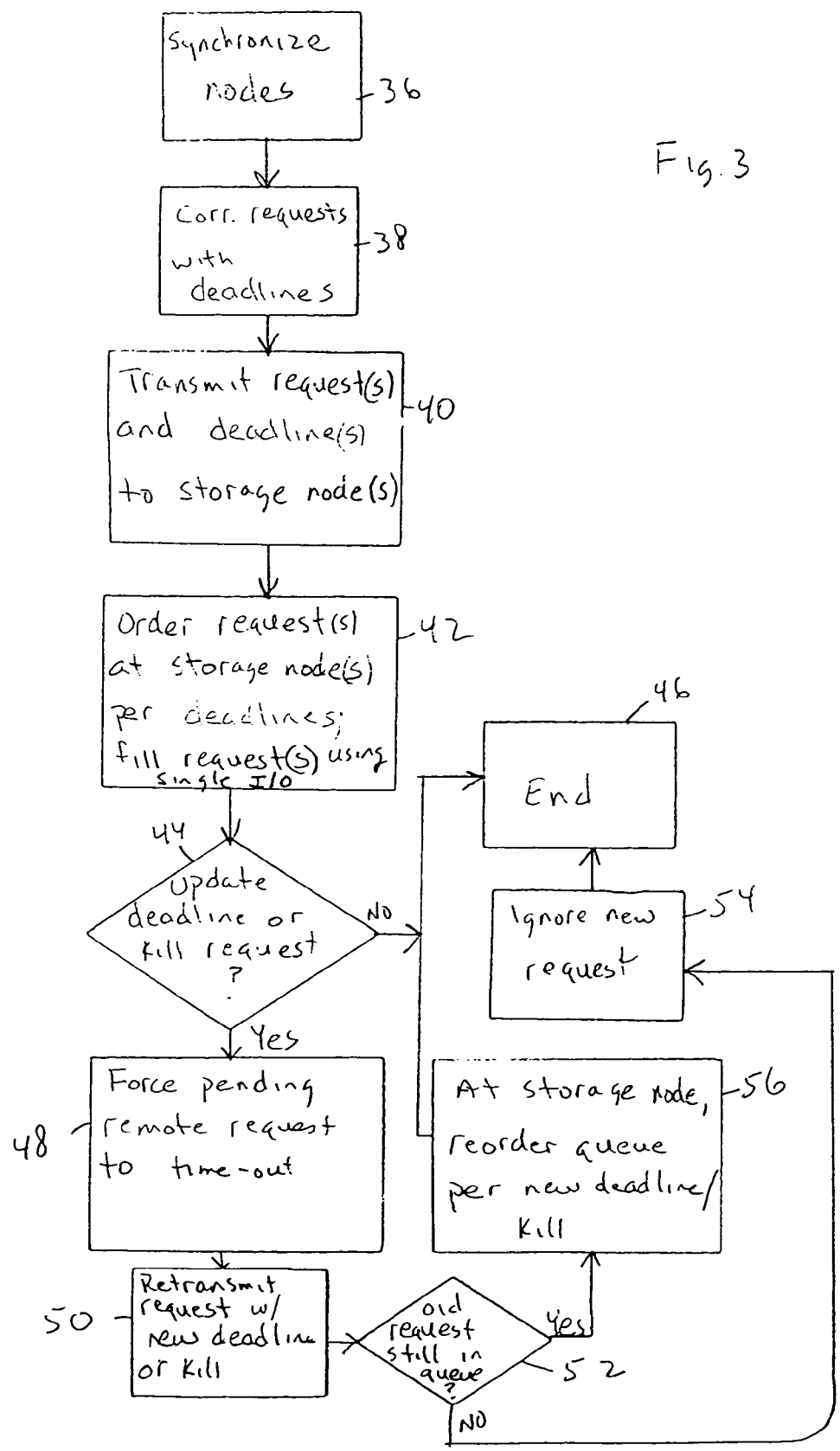

REAL-TIME SHARED DISK SYSTEM FOR COMPUTER CLUSTERS

This application is a continuation-in-part of from U.S. patent application Ser. No. 09/551,745, filed Apr. 18, 2000, now U.S. Pat. No. 6,877,072, which is a continuation of U.S. patent application Ser. No. 09/113,752, filed Jul. 10, 1998, now U.S. Pat. No. 6,182,197, priority from both of which is claimed.

BACKGROUND OF THE INVENTION

1. Field of the Invention

The present invention relates generally to clustered computer systems, and more particularly to systems and methods for accessing shared disk data in a clustered computer environment.

2. Description of the Related Art

Clustered computing refers to the ability of many computer processors to work in consonance with each other to undertake respective portions of large scale computing tasks, or to execute separate applications using a common data storage resource. The computers communicate with each other and/or the data storage resource via a network to, e.g., distribute computational chores among the computers, or to execute their respective independent applications. Using many computers working together to undertake large scale computations is often more cost-effective than providing a single monolithic processor to execute such tasks.

In many clustered computing systems, each computer might be physically connected to one or more respective data storage devices, typically computer disks. Further, to enable more than a single computer to access data on a disk, the disk might be physically connected to a plurality of computers. Such shared system disks are referred to as "physically shared" disks, because they are physically connected to the computers of the system. It will readily be appreciated that such a system, referred to as a shared storage system, not only distributes computations among the several computers, but also distributes data across the several disks.

While physically connecting a disk to several computers is an effective method for sharing storage, it happens that the accompanying input/output (I/O) hardware can be relatively expensive. Moreover, such a system is not readily scalable. More particularly, connecting each one of a large number of computers to each of a large number of disks is not only expensive, but requires excessive and complicated cabling.

Accordingly, the present assignee has introduced a system referred to as "virtual shared disk", or "VSD", in which each computer of a clustered computing system regards each one of many system disks as being physically connected all the system computers, despite the fact that each disk is physically connected only to one or a few computers. VSD achieves this essentially by providing, for each computer, a software module representing a respective system disk, with the software module appearing to the computer as a device driver for the respective disk. To read or write to a disk that is not physically connected to it, a computer invokes the device driver of the "virtual" disk as it would a physically shared disk to request a read or write operation, with the underlying VSD software module then sending the request to the computer in the system that is actually physically connected to the disk.

Regardless of whether the shared system disks are virtual or physical, however, it will be appreciated that two or more system computers might issue read or write requests to a single system disk virtually simultaneously with each other. When this happens, a system disk addresses the competing requests based on considerations that are internal to the disk, and not based on the order in which the requests were received or indeed on any consideration external to the disk. For example, a system disk might respond to competing requests based on the current position of the disk head relative to the sectors of the disk on which the requested data is stored (or is to be stored), with the request that is "closest" to the head being addressed first. As used herein, such ordering is based on "internal" constraints, i.e., constraints that depend on the state of the disk, and not on the priorities of the requests.

Thus, as recognized by the present invention, the above-mentioned process for addressing competing requests to a disk, whether virtually or physically, has the drawback of not considering the fact that one request might be more urgent than another. This is particularly unfortunate in multimedia applications, which typically read a large block of data bits that must be delivered in a particular temporal order. Accordingly, as recognized herein, read and write requests can define response deadlines (i.e., temporally-based priorities) or other, non-temporally-based priorities, beyond which the requests become stale, and satisfying them late consequently makes no sense. As discussed above, however, current shared storage systems do not respond to requests based on priorities defined by the requests, but rather based on internal disk considerations, much less do current shared storage systems consider whether a request should be terminated if it cannot be satisfied within the deadline (or other priority).

Moreover, the present invention understands that one multimedia application might request a first video frame bit that is to be played sooner than a second video frame bit that might be requested by another application. In such a circumstance, it would be desirable for the shared storage system to respond to the first request before the second request, regardless of whether the first request was received before the second request. Unfortunately, current shared disk systems do not contemplate considering the relative priorities of competing requests in determining how to respond to plural near-simultaneous requests to a single system disk.

Accordingly, the present invention recognizes that shared storage systems including VSD can better supply data for multimedia streams for, e.g., video-on-demand, if the shared storage system performance can be made to model real-time multimedia data streaming.

SUMMARY OF THE INVENTION

The invention is a general purpose computer programmed according to the inventive steps herein to submit, update and terminate prioritized data access requests to a shared storage system in a clustered computer system. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein.

In accordance with the present invention, a computer system includes plural client nodes that communicate data access requests to plural storage nodes. The system further includes logic means for associating one or more of the data access requests with respective priorities, e.g., time-based deadlines. Additionally, the system includes logic means for sending the data access requests and priorities to the storage nodes. Moreover, the system includes logic means for ordering the data access requests at the storage nodes based on the respective priorities, such that the data access requests are satisfied in consideration of their respective priorities.

In a preferred embodiment, logic means are provided for changing the priorities of the data access requests, prior to the requests being satisfied by a storage node, to render an updated priority. Logic means then reorder data access requests at the storage nodes, based on the updated priorities. Furthermore, logic means can be provided for terminating one or more data access requests.

Preferably, the computing and storage nodes are loosely synchronized with each other. In an exemplary embodiment, the system is a virtual shared disk (VSD) system, and each storage node includes at least one storage computer and at least one data storage device. Unless the invention is implemented on a system disk controller, each storage computer includes logic means for sending no more than one data access request at a time to the data storage device, such that the data storage device cannot reorder the sequence of responding to data access requests based on considerations that are internal to the data storage device. However, if implemented at a disk controller, the controller could combine the external ordering of the present invention with its conventional request ordering based on internal constraints, e.g., disk state.

In another aspect, in a computer system having plural computers communicating data access requests to a shared storage system, a computer-implemented method is disclosed for satisfying at least two contemporaneous data access requests to a single data storage device of the shared storage system. The method includes responding to the requests in an order that is defined by one or more considerations external to the data storage device.

In yet another aspect, a computer program device includes a computer program storage device readable by a digital processing apparatus and a program means on the program storage device. The program means includes instructions that are executable by the digital processing apparatus for performing method steps for satisfying one or more data access requests. As disclosed in detail below, the method steps embodied by the program means include associating at least some of the data access requests with respective priorities, and then sending the priorities and the data access requests to a shared storage system. With this invention, the shared storage system can respond to the requests using the priorities.

In another aspect, a computer program device includes a computer program storage device readable by a digital processing apparatus and a program means on the program storage device. The program means includes instructions that are executable by the digital processing apparatus for performing method steps for satisfying one or more data access requests. As disclosed in detail below, the method steps embodied by the program means include responding, with a memory system, to at least some of the data access requests in an order based on respective priorities, with the priorities and the data access requests being sent to the memory system.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart showing the logic of the present invention.

DETAILED DESCRIPTION OF THE PREFERRED EMBODIMENTS

Figure 1:
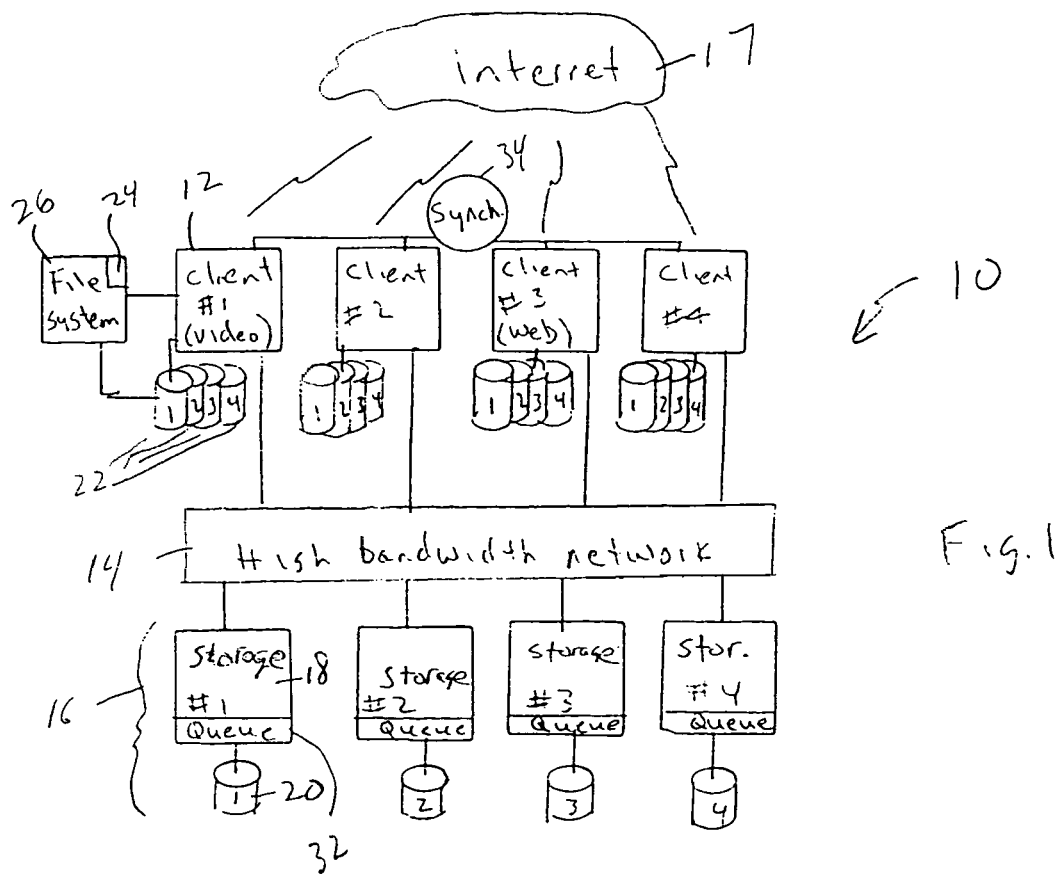
FIG. 1 is a schematic diagram showing the system of the present invention.

Referring initially to FIG. 1, a system is shown, generally designated 10, which includes plural client computers 12 (only client computers 1–4 shown for clarity of disclosure) that access, via a network 14, preferably a high bandwidth network, a shared storage system which includes plural storage nodes 16 (only four storage nodes 16 shown for clarity of disclosure). By "shared storage" is meant shared electronic data storage. As but one example of the possible functions of the client computers 12, the client computer 12 numbered "1" in FIG. 1 can be a video server, whereas the client computer numbered "3" in FIG. 1 can be a high speed World Wide Web server computer, with both client computers 12 communicating simultaneously with respective clients via a wide area network (WAN) 17, such as the Internet or other WAN.

Each storage node 16 includes at least one respective storage computer or storage controller 18 and at least one data storage device 20 that can be, e.g., a data storage disk which is physically connected to its associated storage computer 18. In other words, the present invention can be implemented on the element 18 regardless of whether it is a storage computer (as referred to below) or a storage controller. It is to be understood that while the storage computers 18 are shown separately from the client computers 12, if desired each client computer 12 can function as a server computer to the remaining client computers with respect to any data storage device that is physically connected to the client computer. In any case, the computers of the present invention can be desktop computers such as personal computers or laptop computers made by International Business Machines Corporation (IBM) of Armonk, N.Y. Alternatively, the computers of the present invention may be any computer, including computers sold under trademarks such as AS400, with accompanying IBM Network Stations or, Unix computers, or OS/2 servers, or Windows NT servers, or IBM RS/6000 250 workstations, or other equivalent devices.

In the preferred embodiment, the system 10 uses the virtual shared disk ("VSD") system disclosed in U.S. Pat. No. 5,668,943, owned by the present assignee and incorporated herein by reference. Accordingly, as set forth in the above-referenced patent, each client computer 12 communicates with four virtual disks 22 as though the virtual disks 22 were physically connected to the client computer 12. Actually, however, the client computers 12 need not be physically connected to any storage device, and the storage computer numbered "1" in FIG. 1 might be physically connected only to the disk numbered "1". Likewise, the storage computer numbered "2" might be physically connected only to the disk numbered "2", and so on, with access between the client computers 12 and their virtual disks being undertaken in accordance with the above-referenced patent. It is to be understood, however, that the principles herein apply to shared storage systems in which some or all system disks are physically shared disks, that is, are physically connected to each client computer in the system.

In accordance with the present invention, each client computer 12 can access a deadline module 24 (only one deadline module 24 shown in FIG. 1 for clarity of disclosure). The deadline module 24 can be executed by the respective client computer 12, or by a software-implemented module such as a file system 26 (only one file system 26 shown in FIG. 1) that is associated with the client computer 12, to undertake the inventive logic disclosed below in detail.

Figure 2:
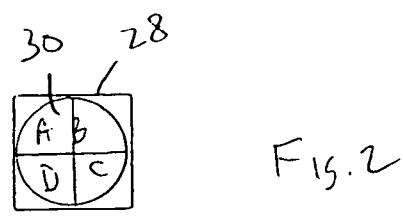
FIG. 2 is a schematic representation of a program storage device.

It is to be understood that the control components such as the deadline module 24 are executed by logic components such as are embodied in logic circuits or in software contained in an appropriate electronic data storage, e.g., a hard disk drive and/or optical disk drive, that are conventionally coupled to the respective client computer 12. Or, the control components can be embodied in other logical components such as a computer diskette 28 shown in FIG. 2. The diskette 28 shown in FIG. 2 has a computer usable medium 30 on which are stored computer readable code means (i.e., program code elements) A–D. In any case, execution of the particular logic components/computer software steps can be distributed among one or more of the computers 12, 18.

The flow charts herein illustrate the structure of the deadline module of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the deadline module 24 may be a computer program that is executed by a processor within the associated client computer 12 (or file system 26) as a series of computer-executable instructions. In addition to the drives mentioned above, these instructions may reside, for example, in RAM of the computer, or the instructions may be stored on a DASD array, magnetic tape, electronic read-only memory, or other appropriate data storage device. In an illustrative embodiment of the invention, the computer-executable instructions may be lines of compiled C++ compatible code.

For reasons that will become clearer after the below discussion, each storage computer 18 includes a respective request queue 32 in which data read and write requests are ordered by priority. Unless the storage node 18 is a system disk controller, only a single input/output (I/O) operation is presented to the associated disk 20 at a time. Also, a software- or hardware-implemented conventional time synchronizer 34 preferably synchronizes the clocks of the computers 12, 18.

By "priority" is meant, in general, a data access request constraint that constrains the system 10 to respond to requests using the respective priorities, but not necessarily to satisfy the requests in absolute order of their priorities, depending on the state of the system 10. For example, although, as disclosed below, data access requests are ordered by priority in the request queues of the disks, a request of a lower priority, e.g., a non-real time request, might be served before a request of a later-arriving but higher priority, e.g., a real-time request, if the particular lower priority request queue is sufficiently short such that the lower priority request, e.g., a non-real time request, can be satisfied first, and the higher priority request, e.g., a real time request, then satisfied within its priority constraint (for example, the deadline). Further, if implemented on a disk controller, the controller could combine the external constraint (i.e., the request priority) with ordering based on the internal state of the associated disk.

It is to be appreciated that the term "priority" as used herein can also be thought of as meaning "class of service". A class of service priority scheme indicates that requests in different classes of service are not necessarily served in a specific order, but rather according to the quality of service specified for that class of service.

Now referring to FIG. 3, the logic of the present invention can be discerned. While FIG. 3 illustrates the logic in a flow sequence for ease of disclosure, it is to be understood that one or more of the steps disclosed below, being event-driven, are undertaken asynchronously.

Commencing at block 36, the various nodes of the system 10 (i.e., the client computers 12 with virtual disks, if any, and the storage nodes 16) are loosely synchronized by means of, e.g., the time synchronizer 34. By "loosely" synchronized is meant that the clocks of the system nodes are synchronized to have the same time reference within the granularity of individual data access requests (typically tens of milliseconds). As recognized by the present invention, such synchronization avoids a storage node 16 favoring one or more client computers 12, effectively ignoring requests from non-favored client computers 12.

Moving to block 38, the logic next correlates or otherwise associates request priorities with some or all data access requests, e.g., read and write requests, from the client computers 12 to the nodes 16 of the shared storage of the system 10. These priorities need not be time-based, but in one exemplary embodiment, the priorities are established by time-based deadlines. The deadline of a data access request represents a latest desired time of response to the request.

In some cases, the priority of a data access request is appended to the request itself. In other circumstances, e.g., when the kernel data structure does not permit tagging a request block with a priority, the priority is transmitted apart from the associated data access request and matched later with the request, to be transmitted with the request to the appropriate storage node 16.

In the preferred embodiment, at block 38 real-time application programming interfaces (API) are invoked to generate appropriate priorities based on, e.g., the count of real-time streams being supported, and on the file rates and file formats being used. If the request is a non-real time request, i.e., a request that does not require fulfillment within any particular time period, such as a request to access a text file, a NULL deadline is assumed, which is dealt with as more fully described below.

As intended by the present invention, the API can be invoked by the end user/application of the requesting client computer 12, but more preferably are invoked by an intermediate subsystem, such as the file system 26 shown in FIG. 1, that is associated with the requesting end user/application. In any case, the API of the present invention are implemented as input/output control (IOCTL) calls. An exemplary priority data structure (with comments) for the preferred VSD embodiment is as follows:

```
typedef struct timestruct_t DEADLINE;
struct vsd_deadline
{
    char    *buf;
                /* The user buffer for the data      */
    DEADLINE deadline;
                /* Deadline associated with the I/O   */
    int     sector_offset;
                /* Sector offset into storage device  */
    int     sector_count;
                /* Number of sectors to be read       */
};
```

For read data access requests, the preferred API is int ioctl(fd, GIODREAD, &dead);

wherein "fd" is the file descriptor that is passed from the requesting application/file system, "GIODREAD" is a constant that identifies a global input/output request, and "&dead" identifies the associated priority data structure. The above-disclosed read IOCTL reads data into a buffer pointed to by a field in the VSD_DEADLINE data structure set forth above. As mentioned previously, the data structure also contains a priority such as a real-time deadline that is used as described below.

In contrast, for write data access requests, the preferred API is int ioctl(fd, GIODWRITE, &dead);

The above-disclosed write IOCTL writes data from a buffer pointed to by a field in the VSD_DEADLINE data structure set forth above. As is the case for read requests, the data structure also contains a priority for write requests.

Moreover, the priority is associated with all subrequests (packets) that an individual data access request might be split into. More specifically, a single data access request can be arranged in multiple packets, based on a message quantum size that is determined by the protocol of the network 14, with all the packets being associated with the same priority. Accordingly, at block 40, the packetized data access requests and associated priorities are transmitted via the network 14 to the appropriate storage nodes 16 of the shared storage of the system 10.

If desired, the subrequests to a particular disk 20 can be reassembled at the associated storage computer 18, and then sent to the disk 20 as the complete request, to promote the efficiency with which the disk 20 responds to the request. Or, the subrequests can be ordered in the proper sequence and then sent directly to the appropriate disk 20.

From block 40, the logic proceeds to block 42, wherein the data access requests with priorities are received by the shared storage and wherein each storage node 16 that receives data access requests orders the requests by priority in the associated request queue 32 (FIG. 1). For a data access request that is non-real time and that consequently has been assigned a null priority in the exemplary embodiment, the request nevertheless is assigned the priority (plus one) of the last real-time access request in the queue 32 upon arrival of the non-real time request at the queue 32. This ensures that the non-real time request will not be continually surpassed by new requests with non-null deadlines.

Other schemes can be used, however, to address non-real time requests while ensuring non-starvation. For example, non-real time requests could be satisfied only if all the queued real-time requests can be satisfied within their respective priorities, or if a maximum latency guaranteed to non-real time requests is met.

In brief cross-reference to FIGS. 1 and 3, unless a system disk controller is used, each storage computer 18 permits only one request at a time from its queue 32 to be passed to the associated storage device 20. In other words, at block 42 contemporaneous data access requests are satisfied serially, using only a single input/output operation at a time with the storage device 20, when no disk controller is used to control the satisfying of requests. This avoids the device 20 controller changing the ordering between requests based on criteria that are internal to the particular device 20. Thus, the data access requests are responded to in an order that is defined by one or more considerations that are external to the data storage device 20. In one embodiment, the queue 32 uses only a single buffer for device 20 access.

It is to be understood that when a single storage computer 18 controls more than one disk 20, a request to one disk 20 can be made simultaneously with a request to another disk 20 controlled by the computer 18. In such a circumstance, the storage computer 18 will include a respective request queue for each disk 20 with which it is associated.

Moving to decision diamond 44, the logic asynchronously determines whether a priority of a request should be updated, or whether the request should be terminated ("killed"). As recognized by the present invention, updating a request's priority is useful when the requesting application/file system must dynamically shift priorities of a data stream on demand, or when a certain time threshold has been reached, or to offset for additional real-time streams or rescheduling of stream invocation (as when video cassette recorder functionality such as "stop", "resume", etc. are supported). Moreover, terminating an outstanding request when, e.g., a storage device 20 stops responding to requests, frees the requesting application to request replica data blocks on other devices 20 in the shared storage of the system 10.

If no request is to be updated or terminated, the process ends at state 46. Otherwise, the logic moves to block 48 to update the priority of a request or to terminate a request as follows, for the exemplary VSD embodiment. When a VSD client computer 12 transmits a data access request to the shared storage of the system 10, the client computer 12 maintains a copy of the outstanding request in a local pending queue, with the copy being associated with a timer. To update the priority of a request, or to terminate a request, the timer that is associated with the request at the client computer 12 is forced to zero at block 48, if the request has not yet been satisfied. Then, at block 50 the request is retransmitted to the shared storage of the system 10 along with a new (updated) priority or, in the case of termination, a termination request is transmitted.

In the preferred embodiment, the IOCTLs for respectively updating a request priority and terminating the request are as follows:

int ioctl(fd,GIODUPDT, &dead);

int ioctl(fd,GIODKILL, &dead), wherein "GIODUPDT" and "GIODKILL" are constants that identify global input/output requests, and "&dead" identifies the associated priority data structures.

For the termination ("kill") operation, the IOCTL determines whether any pending requests use the same buffer that is pointed to by a field in the above-disclosed VSD_DEADLINE data structure. If so, the process that made the request is freed and the request is removed at least from the requesting client computer's pending queue, using the shared memory semantics of the operating system.

Similarly, for the updating operation, the IOCTL determines whether any pending requests use the same buffer that is pointed to by a field in the above-disclosed VSD_DEADLINE data structure. If so, the above-described retransmission of the request, with new priority, is forced as described above.

When the appropriate storage device 20 receives the updated request (or termination request, if sent) it determines, at decision diamond b 52, whether the old request is still in the associated queue 32. That is, the appropriate storage device 20 determines whether the old request has already been satisfied, and if so, the logic moves to block 54 to ignore the updated request or termination request. Otherwise, the logic proceeds to block 56 to reorder the requests in the appropriate queue 32 in accordance with the updated priority of the request (or in accordance with the termination and removal of the request from the queue 32), and then the process ends at state 46. If desired, as mentioned above for "kill" requests, it may be necessary to terminate the request only at the requesting client computer 12 to free the requesting application/file system. It might not be necessary to actually transmit the termination request to the remote storage device 20.

While the particular REAL-TIME SHARED DISK SYSTEM FOR COMPUTER CLUSTERS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited.

We claim:

1. A computer program device comprising:

a computer program storage device readable by a digital processing apparatus; and a program means on the program storage device and including instructions executable by the digital processing apparatus for performing method steps for satisfying one or more data access requests, the method steps comprising:

responding, with a memory system, to at least some of the data access requests based on respective priorities, the priorities and the data access requests being sent to the memory system; wherein the memory system includes at least one controller and at least one associated disk, the controller combining at least one priority with ordering based on an internal state of the associated disk.

\* \* \* \* \*